US 8,192,570 B2

(12) United States Patent
Hand et al.

(10) Patent No.: US 8,192,570 B2
(45) Date of Patent: Jun. 5, 2012

(54) EXHAUST WASHED STRUCTURE AND ASSOCIATED COMPOSITE STRUCTURE AND METHOD OF FABRICATION

(75) Inventors: Michael L. Hand, Huntington Beach, CA (US); Buddhadev Chakrabarti, Walnut, CA (US); Leanne L. Lehman, Aliso Viejo, CA (US); Gopal P. Mathur, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/243,102

(22) Filed: Sep. 23, 2011

(65) Prior Publication Data
US 2012/0066882 A1    Mar. 22, 2012

Related U.S. Application Data

(62) Division of application No. 12/106,512, filed on Apr. 21, 2008, now Pat. No. 8,043,690.

(51) Int. Cl.
*C03B 29/00*  (2006.01)
*C04B 33/24*  (2006.01)
*B29C 47/00*  (2006.01)
*B32B 3/00*   (2006.01)
*B32B 1/04*   (2006.01)
*B32B 3/28*   (2006.01)

(52) U.S. Cl. ............. 156/89.11; 156/89.22; 156/244.13; 428/182; 428/184; 428/72; 428/76

(58) Field of Classification Search ............... 156/89.11, 156/89.22, 244.13; 428/182, 184, 72, 76
See application file for complete search history.

(56) References Cited

U.S. PATENT DOCUMENTS

| 3,215,973 | A |   | 11/1965 | Falconer |
| 4,014,968 | A | * | 3/1977 | Simon ........................... 264/630 |
| 4,017,347 | A | * | 4/1977 | Cleveland ................... 156/89.27 |
| 4,051,289 | A | * | 9/1977 | Adamson ..................... 428/113 |
| 4,822,660 | A | * | 4/1989 | Lipp ............................ 428/113 |
| 5,158,654 | A |   | 10/1992 | Yoshimoto et al. |
| 5,198,282 | A | * | 3/1993 | Baker et al. ................. 428/114 |
| 5,376,598 | A |   | 12/1994 | Preedy et al. |
| 5,519,191 | A | * | 5/1996 | Ketcham et al. ............. 219/552 |
| 5,723,831 | A |   | 3/1998 | Martin et al. |

(Continued)

FOREIGN PATENT DOCUMENTS
EP    2 008 807 A    12/2008
(Continued)

OTHER PUBLICATIONS

PCT Notification and International Search Report for PCT/US2009/038649 dated Aug. 4, 2009.

*Primary Examiner* — Philip Tucker
*Assistant Examiner* — Alex Efta
(74) *Attorney, Agent, or Firm* — Alston & Bird LLP

(57) ABSTRACT

A composite structure and an associated exhaust washed structure are provided which may be formed of ceramic matrix composite (CMC) materials. A method of fabricating a composite structure which may include the CMC material is also provided. A composite structure may include a corrugated septum extending in a lengthwise direction. The composite structure may also include a flute within which the corrugated septum is disposed to form, for example, a partitioned flute assembly.

18 Claims, 6 Drawing Sheets

U.S. PATENT DOCUMENTS

| | | |
|---|---|---|
| 6,051,302 A | 4/2000 | Moore |
| 6,122,892 A | 9/2000 | Gonidec et al. |
| 6,136,237 A | 10/2000 | Straub et al. |
| 6,182,787 B1 | 2/2001 | Kraft et al. |
| 6,746,755 B2 * | 6/2004 | Morrison et al. ............ 428/166 |
| 6,964,169 B2 | 11/2005 | Pancou et al. |
| 2002/0106468 A1 | 8/2002 | Obeshaw |

FOREIGN PATENT DOCUMENTS

| | | |
|---|---|---|
| WO | WO 95/26877 A | 10/1995 |

* cited by examiner

EXHAUST WASHED STRUCTURE AND ASSOCIATED COMPOSITE STRUCTURE AND METHOD OF FABRICATION

CROSS REFERENCE TO RELATED APPLICATION

This application is a divisional of U.S. patent application Ser. No. 12/106,512, filed Apr. 21, 2008 now U.S. Pat. No. 8,043,690 which is hereby incorporated herein in its entirety by reference.

FIELD

Embodiments of the present disclosure relate generally to composite structures and associated methods of fabrication and, more particularly, to composite structures, including a variety of hot exhaust washed structures, manufactured from ceramic matrix composite (CMC) materials as well as associated methods of fabrication.

BACKGROUND

A number of exhaust system components of conventional jet engines as well as other hot exhaust washed structures are fabricated from titanium alloys. While titanium alloys have a number of advantageous material properties, the exhaust system temperatures of next generation jet engines are anticipated to reach a level at which components fabricated from titanium alloys may have an unsatisfactory service life. In this regard, the historical trend has been for each generation of jet engine to exhaust gasses having greater temperatures than the prior generation in an effort by the engine designers to achieve greater thermodynamic efficiency. However, at the exhaust system temperatures predicted for the next generation of jet engines, such as temperatures in excess of 1,000° F., exhaust system components fabricated of titanium alloys, such as exhaust system nozzles and exhaust system centerbodies as well as other hot exhaust washed structures, may oxidize relatively rapidly, thereby disadvantageously reducing the service life of the components.

A number of conventional exhaust system components, such as exhaust system nozzles and exhaust system centerbodies, have been constructed in the form of a honeycomb core sandwich. In this regard, these exhaust system components can include a pair of titanium alloy face sheets disposed on opposite sides of a honeycomb core, which may also be formed of a titanium alloy. In order to reduce the noise emanating from an engine, some of the exhaust system components may include Helmholtz resonators. In order to provide Helmholtz resonators, perforations or other holes may be defined, such as by drilling, through the titanium alloy face sheet which is adjacent to the high-speed flow of exhaust gasses. The perforations or other holes defined by the titanium alloy face sheet open into respective cells of the honeycomb core. By appropriately tuning the geometry of the honeycomb cells, the noise emanating from the engine may be advantageously reduced.

In an effort to provide exhaust system components and other hot exhaust washed structures that can withstand higher temperatures, such as temperatures in excess of 1,000° F., components comprised of high-temperature metal alloys have been proposed. However, these high-temperature metal alloys, such as Inconel 718, Rene 41 and Columbium alloys, are undesirably heavy relative to comparable components fabricated from titanium alloys. Since the weight of an aircraft, including its engine, is a key concern relating to both the performance and cost of operation of the aircraft, the use of exhaust system components and other hot exhaust washed structures formed of high-temperature metal alloys that are heavier than corresponding titanium alloy components have not proven to be a desired solution.

Accordingly, it would be desirable to provide exhaust system components, such as nozzles and centerbodies, as well as other hot exhaust washed structures which can withstand exhaust gas temperatures in excess of 1,000° F. without any meaningful reduction of the service life of the components. Additionally, it would be advantageous to provide exhaust system components, such as nozzles and centerbodies, and other hot exhaust washed structures which can withstand such higher exhaust gas temperatures, but which weigh no more than corresponding titanium alloy components so as to not increase the weight of the engine.

SUMMARY

Embodiments of the present disclosure therefore provide a composite structure and an associated exhaust washed structure which may include ceramic matrix composite (CMC) materials, thereby permitting the composite structure to withstand temperatures in excess of 1,000° F., such as those potentially generated by the exhaust gasses of the next generation of aircraft engines, without a meaningful reduction in the service life of the composite structure and without increasing the weight of the exhaust washed structures relative to corresponding titanium alloy components. According to other embodiments of the present disclosure, methods of fabricating a composite structure which may also include the CMC material are also provided, thereby permitting engine exhaust system components and other hot exhaust washed structures to be fabricated, such as from CMC material, so as to be capable of withstanding temperatures in excess of 1,000° F.

In one embodiment, a composite structure is provided which includes a corrugated septum, which may be comprised of a CMC material, extending in a lengthwise direction. The composite structure also includes a flute, which may also be formed of CMC material, having the corrugated septum disposed therein. The corrugated septum and the flute define a partitioned flute assembly, such as a partitioned CMC flute assembly. The resulting partitioned CMC flute assembly may have radiused corner portions when taken in lateral cross-section. In one embodiment, the composite structure includes first and second face sheets and a plurality of partitioned CMC flute assemblies disposed between the face sheets.

The composite structure of one embodiment also includes a bulk acoustic absorber disposed proximate the corrugated septum and within the flute. The bulk acoustic absorber may be interspersed with convolutes of the corrugated septum. The bulk acoustic absorber may be formed of a ceramic material.

In accordance with another embodiment, an exhaust washed structure is provided which includes a wall member and a plurality of partitioned flute assemblies positioned upon the wall member. Each partitioned flute assembly extends lengthwise along the wall member. Additionally, each partitioned flute assembly is positioned laterally adjacent another partitioned flute assembly. Further, each partitioned flute assembly includes a corrugated septum, which may be formed of a CMC material, extending in the lengthwise direction and a flute, which may also be formed of CMC material, in which the corrugated septum is disposed.

The wall member of one embodiment defines a plurality of sections spaced longitudinally therealong. In this embodiment, a plurality of partitioned CMC flute assemblies are positioned upon each section of the wall member. Each partitioned CMC flute assembly may extend lengthwise along the respective section of the wall member. Additionally, each partitioned CMC flute assembly may be positioned laterally adjacent another partitioned CMC flute assembly within the respective section of the wall member. In this regard, each partitioned CMC flute assembly has a heigth that may change in a longitudinal direction to facilitate side-by-side positioning of the partitioned CMC flute assemblies.

As noted above, each partitioned CMC flute assembly may also include a bulk acoustic absorber which may be formed of a ceramic material. The bulk acoustic absorber is disposed proximate the corrugated septum and within the flute of CMC material. In one embodiment, the bulk acoustic absorber is interspersed with convolutes of the corrugated septum. The exhaust washed structure of this embodiment may also include first and second face sheets disposed on opposite sides of the plurality of partitioned CMC flute assemblies. Each partitioned CMC flute assembly may include radiused corner portions in lateral cross-section.

A method of fabricating a composite structure is also provided in accordance with another embodiment of the present disclosure. The method of this embodiment provides a corrugated septum, which may be formed of a CMC material, that extends in a lengthwise direction. The corrugated septum is cured and then disposed within a flute, which may also be formed of CMC material. The corrugated septum may then be bonded within the flute to form a partitioned flute assembly, such as a partitioned CMC flute assembly.

A bulk acoustic absorber may be positioned proximate the corrugated septum, such as by interspersing the bulk acoustic absorber with convolutes of the corrugated septum. As such, the method of one embodiment may also include the disposition of a plurality of partitioned CMC flute assemblies between first and second face sheets to fabricate, for example, an exhaust washed structure.

BRIEF DESCRIPTION OF THE DRAWINGS

Having thus provided a description in general terms, reference will now be made to the accompanying drawings, which are not necessarily drawn to scale, and wherein.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

As described hereinbelow, a composite structure 10 is provided which may be utilized in a wide variety of applications. As a result of its ability to withstand relatively high temperatures, such as in excess of 1,000° F., without any meaningful reduction of its service life, the composite structure 10 is particularly useful in high-temperature applications. Additionally, the composite structure 10 of some embodiments of the present disclosure may be designed to provide improved structural and acoustic performance relative to more conventional structures formed of metallic alloys. Further, the composite structure 10 of some embodiments of the present disclosure may also be superior in terms of damage tolerance to some other sandwich CMC constructions, such as open fluted core constructions. As such, the composite structure 10 of one embodiment can be utilized to form various engine exhaust system components, such as exhaust system nozzles and/or centerbodies, for aircraft engines as well as other hot exhaust washed structures, such as aft fairing heat shields and thrust reverser inner walls, or the like.

Figure 1:
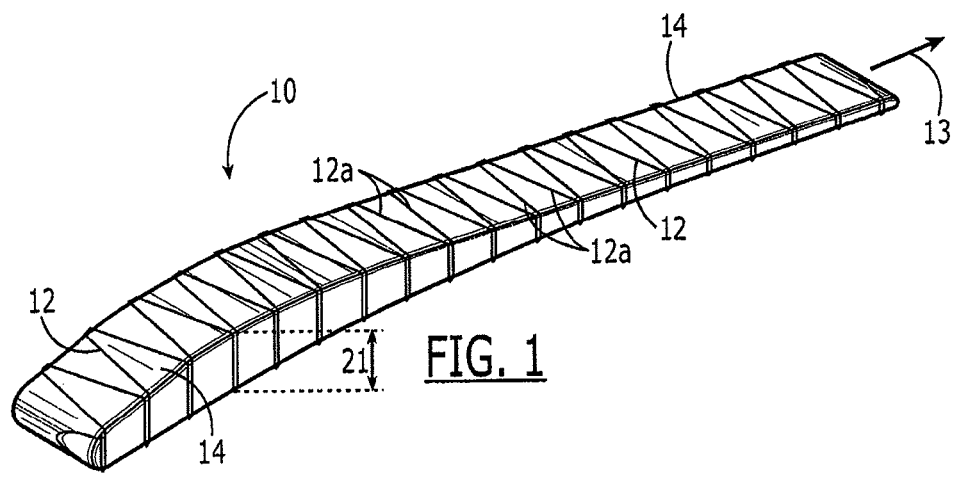
FIG. 1 is an illustration of a perspective view of a corrugated septum formed of a ceramic matrix composite (CMC) material and a plurality of rigidized absorber blocks positioned relative to the corrugated septum in accordance with one embodiment of the present disclosure.

As shown in FIG. 1, a composite structure 10 in accordance with one embodiment to the present disclosure includes a corrugated septum 12 which may be formed of a ceramic matrix composite (CMC) material. As known to those skilled in the art, CMC material is a reinforced ceramic material created from substantially continuous fibers bound in a ceramic matrix. The fibers can be in tape or cloth form and may include, but are not limited to, fibers formed from silicon carbide, alumina, aluminosilicate, aluminoborosilicate, carbon, silicon nitride, silicon boride, silicon boronitride, and similar materials. The ceramic matrix may include, but is not limited to, matrices formed from aluminosilicate, alumina, silicon carbide, silicon nitride, carbon, and similar materials. In one embodiment, the CMC material is comprised of alumina fibers in an aluminosilicate matrix, i.e., an Oxide/Oxide CMC. In another embodiment, the CMC material may be comprised of silicon carbide fibers in a silicon carbide matrix, i.e., an SiC/SiC CMC.

As noted, the corrugated septum 12 is corrugated so as to define a relatively sinuous pattern that extends in a longitudinal or lengthwise direction 13. While the corrugated septum 12 may be formed of two or more corrugated sections that are positioned end to end, the corrugated septum 12 of one embodiment extends continuously in the longitudinal direction 13 from one end of the composite structure 10 to the other end. While the corrugated septum 12 can define a truly sinuous shape, the corrugated septum 12 of the illustrated embodiment is comprised of a plurality of linear segments joined to one another via generally planar webs proximate opposed lateral sides of the composite structure 10. The corrugated septum 12 of the illustrated embodiment therefore defines a number of alternately facing, truncated v-shaped sections or convolutes 12a joined to one another and extending in the longitudinal direction 13. Once the corrugated septum 12 has been formed into the desired corrugated shape, such as by placement upon a female tool, such as without limitation an aluminum or steel tool, the corrugated septum 12 is cured. See operations 42 and 44 of the exemplary method 40 of FIG. 7. In this regard, while no particular cure process is required, oxide/oxide CMC structures are generally cured in a two-step process. The initial cure, made at temperatures on the order of 350° F., strengthens the structure sufficiently that it can be removed from the layup tool. The second, sintering, step of the processing is made at a higher temperature, such as 500° F. to 2,200° F., and may be made with the structure either free standing or partially supported.

The composite structure 10 may also include a bulk acoustic absorber 14 disposed proximate the corrugated septum 12. See operation 46 of FIG. 7. Not all composite structures need a bulk acoustic absorber 14, but since the bulk acoustic absorber 14 is generally designed to absorb noise, composite structures in accordance with embodiments of the present disclosure that are designed for sound reduction purposes generally include a bulk acoustic absorber 14 as shown and described hereinafter. The bulk acoustic absorber 14 may be formed of various materials including, without limitation, fibrous ceramic material. The bulk acoustic absorber 14 is advantageously formed of a material that is capable of withstanding the temperatures employed during construction of the composite structure 10. Additionally, the bulk acoustic absorber 14 may be designed to efficiently dissipate acoustic energy, such as by converting the acoustic energy to waste heat. For example, the bulk acoustic absorber 14 may include structures, such as without limitation cantilever beams and/or intermittently supported beams or plates, which resonate at frequencies excited by the acoustic vibrations. The bulk acoustic absorber 14 may therefore be formed of felts, loosely woven materials and/or foams which can include the foregoing resonating structures. The bulk acoustic absorber 14 may be non-rigid during use of the composite structure in order to appropriately absorb noise. For some manufacturing processes, however, it may be advantageous to temporarily rigidize the bulk acoustic absorber 14 as depicted in operation 46 of FIG. 7 by infusing the bulk acoustic absorber 14 with a fugitive matrix material, such as an organic material including, for example, plastic materials as known to those skilled in the art. In the illustrated embodiment, for example, the rigidized bulk acoustic absorber 14 may include a plurality of rigidized blocks forming the bulk acoustic absorber 14 interspersed with the corrugated septum 12. As shown in FIG. 1, for example, the rigidized blocks forming the bulk acoustic absorber 14 may be sized and shaped to fit snugly within each corrugation of the corrugated septum 12. The rigidized blocks forming the bulk acoustic absorber 14 may be bonded to the corrugated septum 12 to form a subassembly as shown in FIG. 1 and in operation 46 of FIG. 7. Thereafter, during the sintering step, the fugitive material sublimates and escapes through openings in the structure or through the porous CMC shells. Generally, the bulk acoustic absorber 14 must be non-rigid once the composite structure 10 is in use since the rigidized absorber may not effectively reduce the noise.

Figure 2:
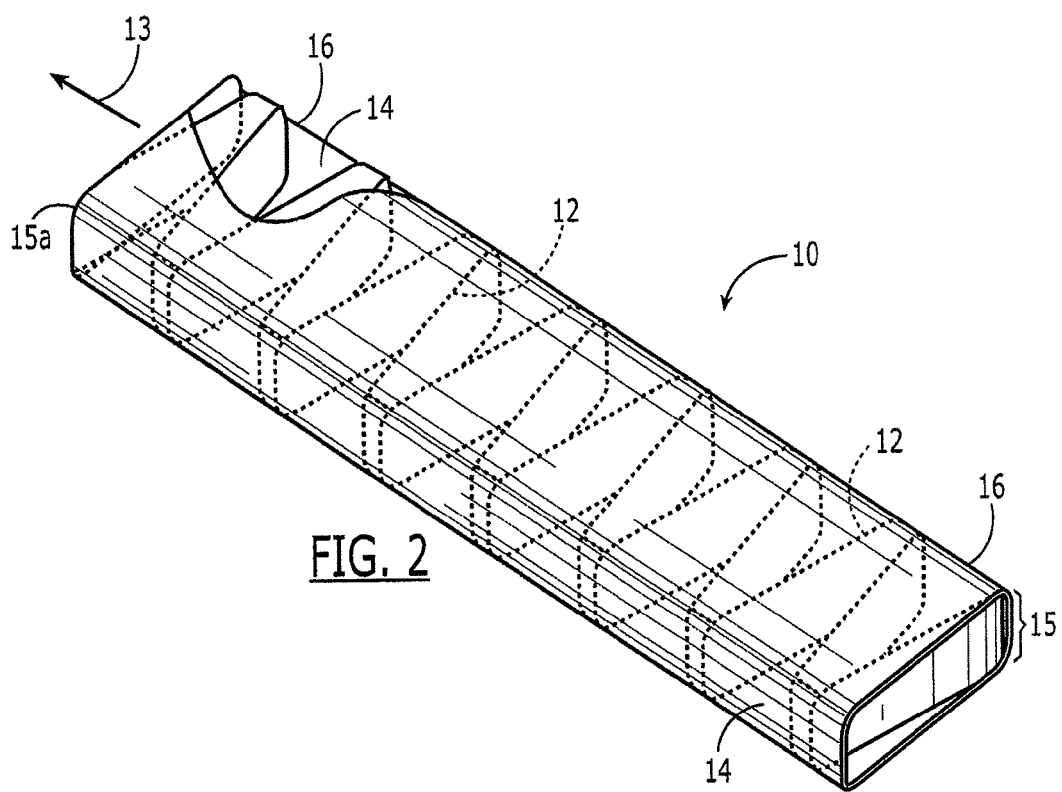
FIG. 2 is an illustration of a perspective view of a composite structure in accordance with one embodiment of the present disclosure.
Figure 7:
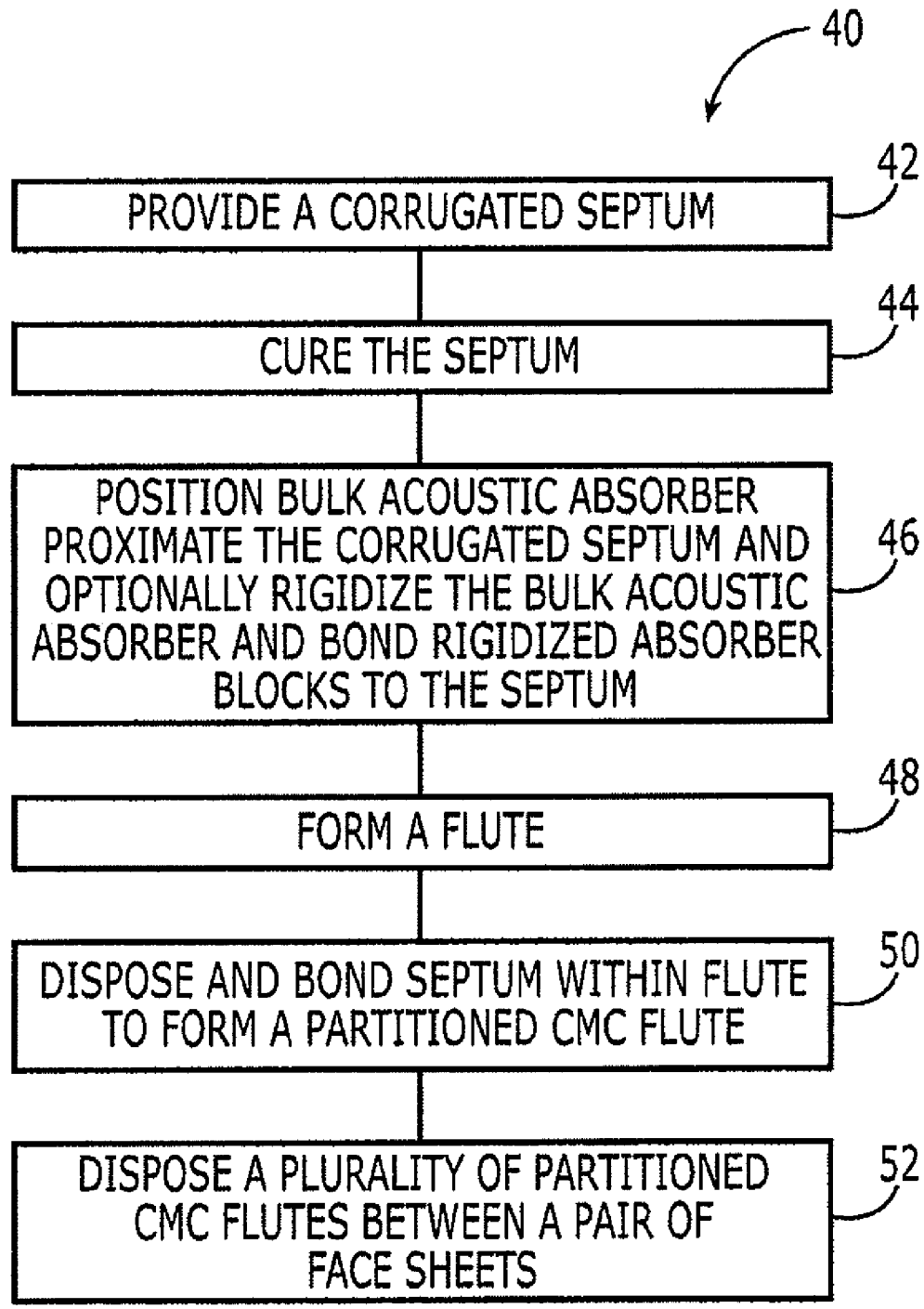
FIG. 7 is an illustration of a flow chart of a method of fabricating a composite structure in accordance with one embodiment of the present disclosure.

In addition to the corrugated septum 12, a flute 16 is also formed, as shown in FIG. 2 and in operation 48 of FIG. 7. A flute 16 is generally a tubular core member of a sandwich structure. In accordance with embodiments of the present disclosure, one or more flutes 16 may be formed of CMC material, such as Oxide/Oxide or SiC/SiC, and, as such, are termed CMC flutes 16 herein by way of example, but not of limitation. Each CMC flute 16 may be formed upon a mandrel, such as without limitation an aluminum mandrel. The CMC flute 16 is then vacuum bagged and cured, such as by means of the two-step process described above. Thereafter, the mandrel is removed from the CMC flute 16 and a corrugated septum 12 is inserted and bonded within the CMC flute 16, as provided by operation 50 of FIG. 7. In one embodiment, the corrugated septum 12 when cured is wider than an individual CMC flute 16 such that the corrugated septum 12 may be cut into lengthwise strips after being cured with each strip being inserted and bonded into a respective CMC flute 16.

The combination of the corrugated septum 12 and the flute 16, such as illustrated in FIG. 2, may be termed a partitioned flute assembly 15. As a result of the construction of the corrugated septum 12 and the flutes 16 from a CMC material in accordance with one embodiment, the partitioned flute assembly 15 is referenced herein as a partitioned CMC flute assembly 15 by way of example, but not of limitation. CMC flutes 16 may be formed to have a number of different shapes in lateral cross-section. For example, the CMC flutes 16 may be formed to have a trapezoidal shape in lateral cross-sections. Alternatively, CMC flutes 16 may be formed to have a more rectangular shape in lateral cross-section, as shown in FIG. 2. As shown in FIG. 2, for example, the partitioned CMC flute assembly 15 may have radiused corners 15a.

A composite structure 10 of embodiments of the present disclosure advantageously concurrently addresses structural, acoustic and damage tolerance issues, while being capable of deployment in high temperature environments, such as those characteristic of jet engine exhaust systems, without any meaningful reduction in its service life. In this regard, the extension of the corrugated septum 12 in a longitudinal direction 13 in combination with the rigidized form of the bulk acoustic absorber 14 reduces noise propagation both in the longitudinal direction 13 and through the composite structure 10 in any lateral direction. As a result of its elongate configuration, the composite structure 10 of embodiments of the present disclosure has substantial strength and stiffness in the longitudinal direction 13. Moreover, by forming the corrugated septum 12 and the surrounding plies of the CMC flute 16 from a CMC material, the composite structure 10 also has substantial strength and stiffness in lateral directions substantially perpendicular to the longitudinal axis 13. Additionally, the corrugated septum 12 may provide improved damage tolerance. For example, the corrugated septum 12 may insure or at least increase the likelihood that an object penetrating one of the lateral sides of the composite structure 10 would lose significant energy while passing through the composite structure 10. In this regard, the damage tolerance of the composite structure 10 may be tuned by more closely spacing the convolutes 12a of the corrugated septum 12 and/or by increasing the thickness of the corrugated septum 12 in order to increase the damage tolerance or by more widely separating the convolutes 12a and/or by decreasing the thickness of the corrugated septum 12 in order to reduce the damage tolerance. As such, the composite structure 10 provides advantageous structural, acoustic and damage tolerance characteristics.

For an exhaust system application as described below in conjunction with FIGS. 3-6, it may be advantageous to restrict impact damage to a single face sheet 18 and the underlying core formed of the composite structure 10, for reasons regarding both aerodynamic performance and repairability. If only one face sheet 18 is penetrated, the structure 10 is still capable of separating two exhaust flows. Also, damage to a single face sheet 18 is easier to repair in the field than damage penetrating both face sheets 18. If only one face sheet 18a has been penetrated, the back face sheet 18b can be used to contain variously reinforced slurry mixtures that can then be cured in place sufficiently that the part can be returned to service. If the damage penetrates both face sheets 18, the part may need rework. For this reason, a fine celled core is better from a damage tolerance standpoint than a more open core structure. Similarly, a thick walled core is more likely to stop a penetrator short than a thin walled core. The desire for damage tolerance is balanced against the desire to minimize weight in flight structures. The corrugated septum 12 of embodiments of the present disclosure allows tailoring damage tolerance versus weight to obtain the optimal core design for a given application.

Moreover, the composite structure 10 has a design that lends itself to being manufacturable. In this regard, the corrugated septum 12 formed of a CMC material may be appropriately shaped. The corrugated septum 12 may be cured on a layup tool, such as the type of tool that would be used for conventional polymeric matrix composite layup, for example and without limitation, a block of steel with the convolute shape machined therein. Since draping the CMC prepreg over the convolutes 12a by hand could be time consuming, a manufacturing aid could be used to pre-configure the CMC prepreg before placing it on the tool. In one embodiment, a manufacturing aid could be a pair of combs, that is, parallel pegs mounted in long bases at the spacing of the desired septum corrugations. The combs would, in turn, be mounted in a frame which guided and controlled the extent of their relative movement. In use, a long strip of prepreg material would be placed between the combs and the combs would be moved so that the pegs of one comb passed between the pegs of the other comb, forming the prepreg fabric into the correct shape to drape smoothly over the layup tool. The corrugated septum 12 can then be cured as described above. A bulk acoustic absorber 14 may then be inserted between individual corrugations of the corrugated septum 12 in either a rigidized or non-rigidized form. In one embodiment, the corrugated septum 12 and the bulk acoustic absorber 14 may thereafter be inserted into and bonded within a CMC flute 16 which has been formed and cured as described above, thereby forming a partitioned CMC flute assembly 15. Alternatively, the flute 16 may be wrapped in-place about a pre-cured corrugated septum 12 that is at least partially filled with a fugitive tooling material which may or may not include a bulk acoustic absorber 14 depending upon the desire for the resulting composite structure 10 to provide acoustic attenuation. While certain construction methods have been herein described, the composite structure 10 of embodiments of the present disclosure can be manufactured in a wide variety of manners.

Figure 3:
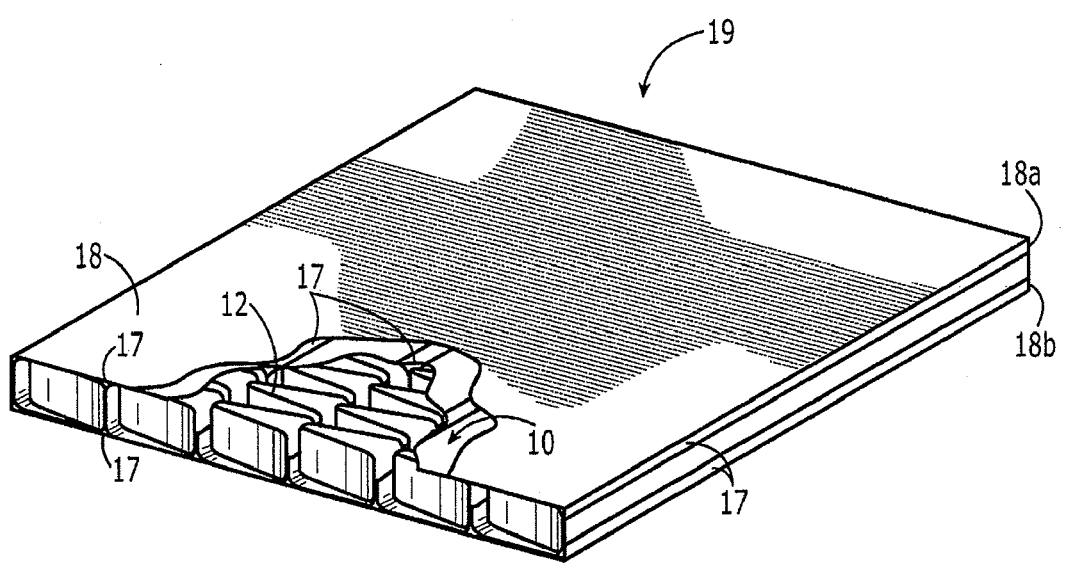
FIG. 3 is an illustration of a perspective view of a composite structure including a plurality of partitioned CMC flute assemblies in accordance with one embodiment of the present disclosure.

Once the composite structure 10 is formed and cured, one or more of the precured composite structures 10 are generally positioned between a pair of face sheets 18 to form a resulting structural assembly 19, such as shown in FIGS. 3-6 and in operation 52 of FIG. 7 and described below. If desired, fillets or noodles 17, as shown in FIG. 3, also generally formed of a CMC material, may be positioned or inserted at the nodes or corners between the partitioned CMC flute assemblies 15. The face sheets 18 can be comprised of a variety of different materials, but also are comprised of a CMC material in one embodiment, such as the same CMC material forming the corrugated septum 12 and the CMC flute 16. The structural assembly 19 is then vacuum bagged and cured in an autoclave with pressures up to 100 psi and temperatures up to 400° F. Then, the structural assembly 19 is removed from the autoclave and vacuum bag and then sintered without pressure at elevated temperatures using a stepped profile that may range from 500° F. to 2,200° F. The composite structure 10 may be formed to have a rectangular shape as shown in FIG. 2, or a trapezoidal shape. As will be apparent to those skilled in the art, the composite structure 10 can have other shapes depending upon the application in which the composite structure 10 would be deployed. Moreover, the partitioned CMC flute assemblies 15 can be packed adjacent to one another or placed separately at intervals between the face sheets 18. Embodiments therefore provide a structural assembly 19 in which the performance of longitudinally extending CMC flutes 16 is enhanced by the addition of a corrugated septum 12. The resulting structural assembly 19 is a shear carrying assemblage of tubular partitioned CMC flute assemblies 15, typically extending in a substantially parallel fashion. The flute 16 cross-section can vary in its size along its length to accommodate the space between face sheets 18. The flute 16 is typically the primary load carrying core member. A fundamental advantage of partitioned CMC flute assemblies 15 is that they provide a large surface for bonding to the sandwich face sheets 18. Competing core options, such as honeycomb, require edge bonding, which may be difficult to accomplish in CMC materials. As noted above, the corrugated septum 12 may perform at least three functions: it may block acoustic transmission down the length of the flute 16, it may stiffen the flute 16 laterally and, by resisting though-the-thickness penetration of the sandwich, it may improve damage tolerance. Moreover, for manufacturability, the corrugated septum 12 may be formed from a single corrugated strip of CMC material.

Figure 4:
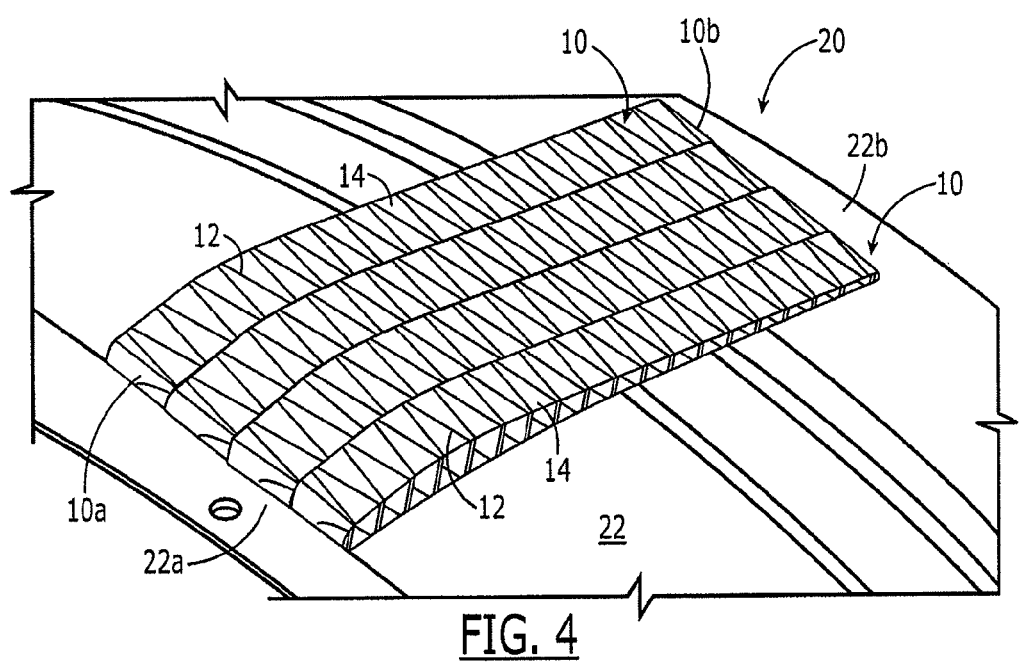
FIG. 4 is an illustration of an engine exhaust system nozzle having a plurality of partitioned CMC flute assemblies disposed upon an inner skin in accordance with one embodiment of the present disclosure.
Figure 5:
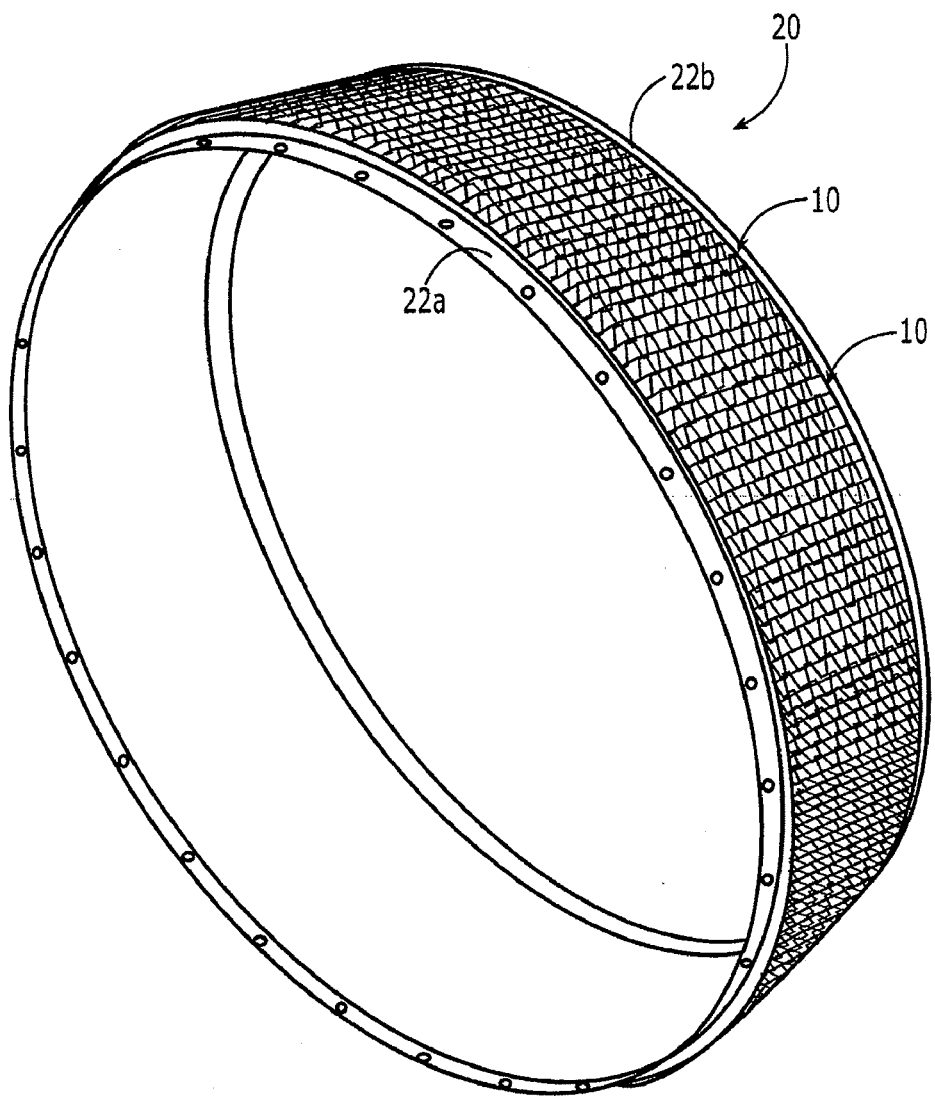
FIG. 5 is an illustration of a perspective view of an exhaust system nozzle, as shown in FIG. 4, including a complete set of partitioned CMC flute assemblies prior to placement of an outer skin thereover in accordance with one embodiment of the present disclosure.
Figure 6:
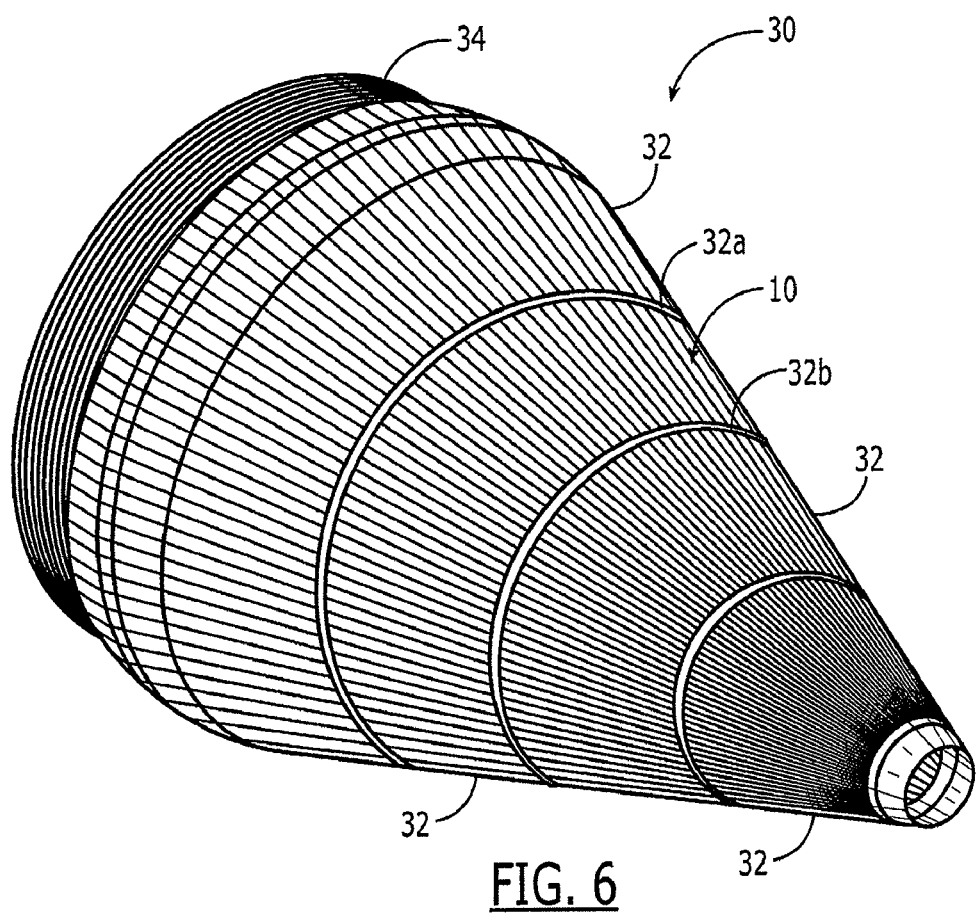
FIG. 6 is an illustration of a perspective view of a centerbody including a plurality of sections with a plurality of partitioned CMC flute assemblies disposed side-by-side within each section in accordance with one embodiment of the present disclosure.

Although composite structures 10 of embodiments of the present disclosure may be deployed in a variety of applications, the composite structure 10 of one embodiment forms a portion of an engine exhaust system component or other hot exhaust washed structure 20, as shown in FIGS. 4-6. For example, the composite structure 10 of one embodiment may form a portion of an exhaust washed structure 20, such as an exhaust system nozzle. As shown in FIGS. 4 and 5, the exhaust washed structure 20 may be an engine component having a wall member 22, e.g., an inner face sheet 18a (FIG. 3), extending from a forward end 22a to an opposed rearward end 22b. A plurality of composite structures 10 may then be positioned side by side about the exhaust washed structure 20 such that each composite structure 10 also extends from a forward end 10a proximate the forward end 22a of the exhaust washed structure 20 to a rearward end 10b proximate the rearward end 22b of the exhaust washed structure 20. The composite structures 10 which are utilized in the fabrication of an exhaust washed structure 20 of the embodiment shown in FIGS. 4 and 5 are not rectangular solids, but instead, have a more tapered shape, such as shown in FIG. 1. In other words, when considered in a lengthwise extending direction 13 from the forward end 22a to the rearward end 22b, the height of the composite structure 10 initially increases to a maximum height 21 before gradually decreasing thereafter in height to the rearward end 22b. The composite structures 10 may have other shapes in other applications, if so desired. The composite structures 10 are positioned side by side so as to extend circumferentially about the entire exhaust washed structure 20. Once the composite structures 10 have been positioned upon the wall member 22, another face sheet 18b (FIG. 3), e.g., an outer skin, may be disposed upon the composite structures 10. The inner 18a and outer 18b face sheets may also be formed of CMC materials, e.g., oxide/oxide CMC or SiC/SiC CMC, with the inner 18a and outer 18b face sheets being cured after the outer face sheet 18b is placed thereupon, as described above in conjunction with FIG. 4.

In order to reduce the noise emanating from the engine, one or more perforations, e.g. holes, may be formed through the wall member 22 and through the CMC flutes 16 of the composite structure 10. As such, the airflow through the exhaust washed structure 20, e.g., a high speed flow of exhaust gases, will be in fluid communication with the interior of the composite structure 10, namely, the corrugated septum 12 and the bulk acoustic absorber 14, which serves to dissipate the noise associated with the airflow through the exhaust washed structure 20.

In another example, the composite structures 10 may be utilized in the construction of a centerbody 30. As shown in FIG. 6, a centerbody 30 of an engine exhaust system may have a frustoconical shape. As a result of the frustoconical shape, composite structures 10 positioned upon the centerbody 30 would desirably be tapered from the forward end 10a to the rearward end 10b (FIG. 4) in order to be positioned immediately adjacent to each other. In order to reduce or eliminate the taper and to accordingly simplify the manufacturing process, while insuring that the composite structures 10 can be positioned close to, if not, immediately adjacent one another in order to take advantage of the structural, acoustical and damage tolerance properties of the composite structures 10, the centerbody 30 may be divided into a plurality of sections 32 or bays. Each section 32 extends circumferentially about the centerbody 30 and defines a different longitudinal portion of the centerbody 30.

Within each section 32, a plurality of composite structures 10 may be positioned in a side by side manner upon a wall member 34, e.g., an inner face sheet 18a (FIG. 3), of the centerbody 30 such that each composite structure 10 extends from a forward end 10a proximate a forward end 32a of the respective section 32 to a rearward end 10b proximate a rearward end 32b of the respective section 32. By having divided the centerbody 30 into sections 32, the tapering of the composite structures 10 in a lengthwise extending direction can be reduced or eliminated since the composite structures 10 need not extend along the entire length or even a majority of the length of the centerbody 30. Thus, the composite structures 10 may be fabricated in a relatively straightforward manner and may still be positioned closely, if not immediately adjacent, to one another so as to provide sufficient structural, acoustic and damage tolerance performance. As with the exhaust washed structure 20 of FIG. 5, an outer face sheet 18b (FIG. 3) may be disposed over the composite structures 10 to complete the fabrication of the centerbody 30. As with the exhaust washed structure 20 of FIG. 5, the inner 18a and outer 18b face sheets are also formed of CMC materials, such as oxide/oxide CMC or SiC/SiC CMC.

Many modifications and other embodiments of the embodiments set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. For example, although certain fabrication techniques were described, the composite structure 10 may be formed in other manners such as a fabrication method in which flute halves are formed and partially cured in separate tooling before insertion of the corrugated septum 12. Although specific terms are employed herein, they are used in a generic and descriptive sense only and not for purposes of limitation.

That which is claimed:

1. A method of fabricating an exhaust washed composite structure comprising:
   providing a corrugated septum comprised of a ceramic matrix composite (CMC) material extending in a lengthwise direction;
   curing the corrugated septum;
   positioning a bulk acoustic absorber so as to be interspersed with convolutes of the corrugated septum;
   forming a flute of CMC material; and
   disposing the corrugated septum following curing and the bulk acoustic absorber within the flute to form a partitioned flute assembly.

2. A method according to claim 1 wherein positioning the bulk acoustic absorber comprises rigidizing the bulk acoustic absorber and bonding rigidized blocks of the bulk acoustic absorber to the corrugated septum.

3. A method according to claim 1 further comprising disposing a plurality of partitioned flute assemblies between first and second face sheets.

4. A method according to claim 1 further comprising bonding the corrugated septum within the flute.

5. A method according to claim 1 wherein disposing the corrugated septum within the flute forms a partitioned CMC flute assembly.

6. A method according to claim 5 wherein the partitioned CMC flute assembly has radiused corner portions.

7. A method according to claim 1 further comprising providing the bulk acoustic absorber comprised of a non-rigid material.

8. A method according to claim 1 further comprising providing the bulk acoustic absorber comprised of a ceramic material.

9. A method according to claim 1 wherein forming the flute comprises forming the flute so as to define at least one perforation to establish fluid communication between the corrugated septum and the bulk acoustic absorber and an external environment.

10. A method of fabricating an exhaust washed structure comprising:
    providing a wall member; and
    positioning a plurality of partitioned flute assemblies upon the wall member and laterally adjacent another partitioned flute assembly so that each partitioned flute assembly extends lengthwise along the wall member, wherein each partitioned flute assembly comprises:
    a corrugated septum comprised of a ceramic matrix composite (CMC) material extending lengthwise; and
    a flute of CMC material having the corrugated septum disposed therein.

11. A method according to claim 10 wherein the wall member defines a plurality of sections spaced lengthwise therealong, wherein positioning the plurality of partitioned flute assemblies upon the wall member comprises positioning a plurality of partitioned flute assemblies upon each section of the wall member so that each partitioned flute assembly extends lengthwise along the respective section of the wall member, and wherein each partitioned flute assembly is positioned laterally adjacent another partitioned flute assembly within the respective section of the wall member.

12. A method according to claim 10 further comprising providing the plurality of partitioned flute assemblies with each partitioned flute assembly changing in lateral width in a lengthwise direction.

13. A method according to claim 10 further comprising providing the plurality of partitioned flute assemblies with each partitioned flute assembly further comprising a bulk acoustic absorber disposed proximate the corrugated septum and within the respective flute.

14. A method according to claim 13 wherein the bulk acoustic absorber is interspersed with convolutes of the corrugated septum.

15. A method according to claim 13 wherein the bulk acoustic absorber is comprised of a non-rigid material.

16. A method according to claim 13 wherein the bulk acoustic absorber is comprised of a ceramic material.

17. A method according to claim 10 further comprising providing the plurality of partitioned flute assemblies with each partitioned flute assembly in lateral cross-section having radiused corner portions.

18. A method according to claim 10 further comprising establishing fluid communication between the corrugated septum and the external environment via at least one perforation defined by the wall member and the flute.

* * * * *